US008219917B2

(12) United States Patent
Black-Ziegelbein et al.

(10) Patent No.: US 8,219,917 B2
(45) Date of Patent: Jul. 10, 2012

(54) BUBBLING UP TASK SEVERITY INDICATORS WITHIN A HIERARCHICAL TREE CONTROL

(75) Inventors: Elizabeth Black-Ziegelbein, Iowa City, IA (US); Michael P. Etgen, Cary, NC (US); Bruce A. Viars, High Point, NC (US)

(73) Assignee: International Business Machines Corporation, Armonk, NC (US)

( * ) Notice: Subject to any disclaimer, the term of this patent is extended or adjusted under 35 U.S.C. 154(b) by 1662 days.

(21) Appl. No.: 11/189,616

(22) Filed: Jul. 26, 2005

(65) Prior Publication Data

US 2007/0028188 A1 Feb. 1, 2007

(51) Int. Cl.
*G06F 15/177* (2006.01)
*G06F 3/048* (2006.01)
(52) U.S. Cl. ............................ 715/736; 715/711; 715/853
(58) Field of Classification Search .................. 715/736, 715/835, 966, 708, 711–713, 715, 738, 853–855, 715/860
See application file for complete search history.

(56) References Cited

U.S. PATENT DOCUMENTS

| | | | |
|---|---|---|---|
| 4,759,068 A | | 7/1988 | Bahl et al. |
| 5,701,137 A | * | 12/1997 | Kiernan et al. ............... 715/853 |
| 5,956,718 A | * | 9/1999 | Prasad et al. ........................... 1/1 |
| 6,147,687 A | * | 11/2000 | Wanderski .................... 715/853 |
| 6,407,760 B1 | * | 6/2002 | Aritomi ......................... 715/810 |
| 6,437,812 B1 | * | 8/2002 | Giles et al. .................... 715/853 |
| 6,496,209 B2 | * | 12/2002 | Horii ............................. 715/853 |
| 6,738,933 B2 | | 5/2004 | Fraenkel et al. |
| 6,765,597 B2 | | 7/2004 | Barksdale et al. |
| 7,472,388 B2 | | 12/2008 | Fukunari et al. |
| 2002/0154177 A1 | * | 10/2002 | Barksdale et al. ............ 345/853 |
| 2003/0028823 A1 | | 2/2003 | Kalleia et al. |
| 2003/0061324 A1 | | 3/2003 | Atherton et al. |
| 2004/0104946 A1 | * | 6/2004 | Li .................................. 345/853 |
| 2005/0066293 A1 | * | 3/2005 | Hunt ............................. 715/854 |
| 2005/0097472 A1 | * | 5/2005 | Machida ....................... 715/736 |
| 2008/0189632 A1 | * | 8/2008 | Tien et al. ..................... 715/764 |

FOREIGN PATENT DOCUMENTS

| | | |
|---|---|---|
| JP | 11 203164 | 7/1999 |
| JP | 2006-326750 | 12/2006 |

* cited by examiner

*Primary Examiner* — William Bashore
*Assistant Examiner* — Andrew Tank
(74) *Attorney, Agent, or Firm* — Steven M. Greenberg, Esq.; Carey, Rodriguez, Greenberg & O'Keefe

(57) ABSTRACT

A computer automated method for bubbling-up condition severity indicators in a hierarchical tree control can include identifying a node in the hierarchical tree control that has been obscured in a collapsed branch of the hierarchical tree control, bubbling-up a status for the identified node to a visible parent node, rendering a status icon for the status adjacent to the visible parent node, and, responsive to an expansion of the collapsed branch rendering the identified node visible, relocating the status icon adjacent to the identified node. Optionally, a depth can be determined for the identified node, a visual characteristic for the status icon can be selected based upon the depth, and the status icon can be rendered using the selected visual characteristic.

13 Claims, 2 Drawing Sheets

BUBBLING UP TASK SEVERITY INDICATORS WITHIN A HIERARCHICAL TREE CONTROL

BACKGROUND OF THE INVENTION

1. Field of the Invention

The present invention relates to application server management and more particularly to visualizing a system and system state using a hierarchical tree control in an application server management tool.

2. Description of the Related Art

The popularization of more complex, enterprise computing environments has resulted in efforts to explore the relationship between the state of a host platform and the performance of a hosted application. To further explore the changing states of applications deployed within the enterprise, application server management tools have been developed whose purpose is to detect state changes of a monitored application. In furtherance of its purpose, typical application server management tools can be coupled to monitored applications and can monitor resources which affect the operation of the host platform and any executing applications within the application server.

Recent developments in application server monitoring tools provide for performance monitoring software which monitors the performance and efficiency of systems and rebalances or off-loads heavy workloads to applications servers that enjoy spare capacity. Using an advanced for of an application server monitoring tool, network managers can choose to manually approve any changes to a server farm configuration, or network managers can elect for the automated application of changes. Modern application server monitoring tools further can partition large jobs over multiple processors, databases and application servers to provide an optimal level of performance, and can prioritize a workload based on the relative importance of an application to a business process.

To facilitate the visualization of an application server system topology and the state of the application server system, hierarchical tree controls have been liberally incorporated in the user interface of application server management tools. Hierarchical tree controls organize a system topology into a tree hierarchy consisting of a root node representing the system, a multiplicity of leaf nodes representing the atomic elements of the system, and any number of intermediate parent nodes for the leaf nodes. Individual branches of the tree hierarchy can be collapsed and expanded at will within the user interface so as to provide a customized view of the system within the limited display space of the user interface.

Within a tree hierarchy, some leaf nodes, for instance leaf nodes representing application servers, can be "sick" in that logic executing within the application server can fault or approach a fault condition resulting in a high severity error condition. When an application server is "sick", a condition severity icon can be displayed adjacent to the node for the corresponding application server name in the tree hierarchy. In this way, a viewer can visually identify the sick application server. Notwithstanding, in the event where the branch containing the node for the sick application server has been collapsed, the viewer will not be able to visually detect the sick application server. Moreover, to the extent that the node for the sick application server is at a very deep level, the display space for the user interface may not be able to easily accommodate a fully expanded hierarchical tree control.

BRIEF SUMMARY OF THE INVENTION

Embodiments of the present invention address deficiencies of the art in respect to hierarchical tree controls for application server monitoring and provide a novel and non-obvious method, system and computer program product for bubbling up condition severity indicators within a hierarchical tree control. In a first embodiment, a computer automated method for bubbling-up condition severity indicators in a hierarchical tree control can include identifying a node in the hierarchical tree control that has been obscured in a collapsed branch of the hierarchical tree control, bubbling-up a status for the identified node to a visible parent node, rendering a status icon for the status adjacent to the visible parent node, and, responsive to an expansion of the collapsed branch rendering the identified node visible, relocating the status icon adjacent to the identified node.

In one aspect of the invention, rendering a status icon for the status adjacent to the visible parent node can include determining a depth for the identified node, selecting a visual characteristic for the status icon based upon the depth, and rendering the status icon using the selected visual characteristic. In this regard, selecting a visual characteristic for the status icon based upon the depth, can include selecting a shading for the status icon based upon the depth. Moreover, selecting a visual characteristic for the status icon based upon the depth can include selecting a visual characteristic for the status icon based upon a relative distance of the identified node from the visible parent node. Finally, selecting a shading for the status icon based upon the depth, can include selecting a shading for the status icon based upon a relative distance of the identified node from the visible parent node.

In another embodiment, a data processing system for bubbling-up condition severity indicators in a hierarchical tree control can include a monitoring tool coupled to a host computing platform, a user interface associated with the monitoring tool, and a hierarchical tree control disposed in the user interface, the hierarchical tree control include one or more nodes in collapsible and expandable branches. Finally, the system can include bubble-up logic coupled to the hierarchical tree control. The bubble-up logic can include program code enabled to render a status icon for a hidden one of the nodes adjacent to a visible parent node for the hidden one of the nodes. The bubble-up logic further can include program code enabled to relocate the status icon adjacent to the hidden one of the nodes when expanding a branch containing the hidden one of the nodes to render the hidden one of the nodes visible.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for bubbling-up condition severity indicators in a hierarchical tree control. In accordance with an embodiment of the present invention, a hierarchical tree control can be configured for representing a system hierarchy, for example an application server system hierarchy in an enterprise environment. Each node of the hierarchical tree control can represent one of a host environment, a resource in the host environment, or logic executing in the host environment. Branches of the hierarchical tree control can be collapsed and expanded through a user interface for the hierarchical tree control.

Notably, a state for each node in the hierarchical tree control can be acquired and the state can be represented within the hierarchical tree control, for instance by way of an iconic representation adjacent to the visual representation of the node. In this regard, when a node has reached a critical severity level for a fault or potential fault condition, an icon can be rendered adjacent to the node which indicates a critical severity level and visually calls attention to the node. Where the visual representation of the node is hidden from view due to the collapsed nature of a branch containing the node, the state of the node can be bubbled up to its nearest, visible parent node and rendered in an adjacent icon.

Moreover, to indicate a relative depth of the hidden view of the node, the visual representation can vary. As an example, the visual representation can become more and more faded as the hidden node lies further and further away from the visible parent node. Finally, to the extent that multiple nodes are obscured from view due to the collapsed nature of a branch containing the nodes, the icon for the nearest, visible parent node can represent the state of the node having associated with it the most severe condition. Thus, notwithstanding the obscured nature of a node in the system, one viewing the hierarchical tree control can detect a severe condition in a hidden node and further the viewer can gauge a relative depth within the hierarchy of the node by reference to the severity icon.

Figure 1:
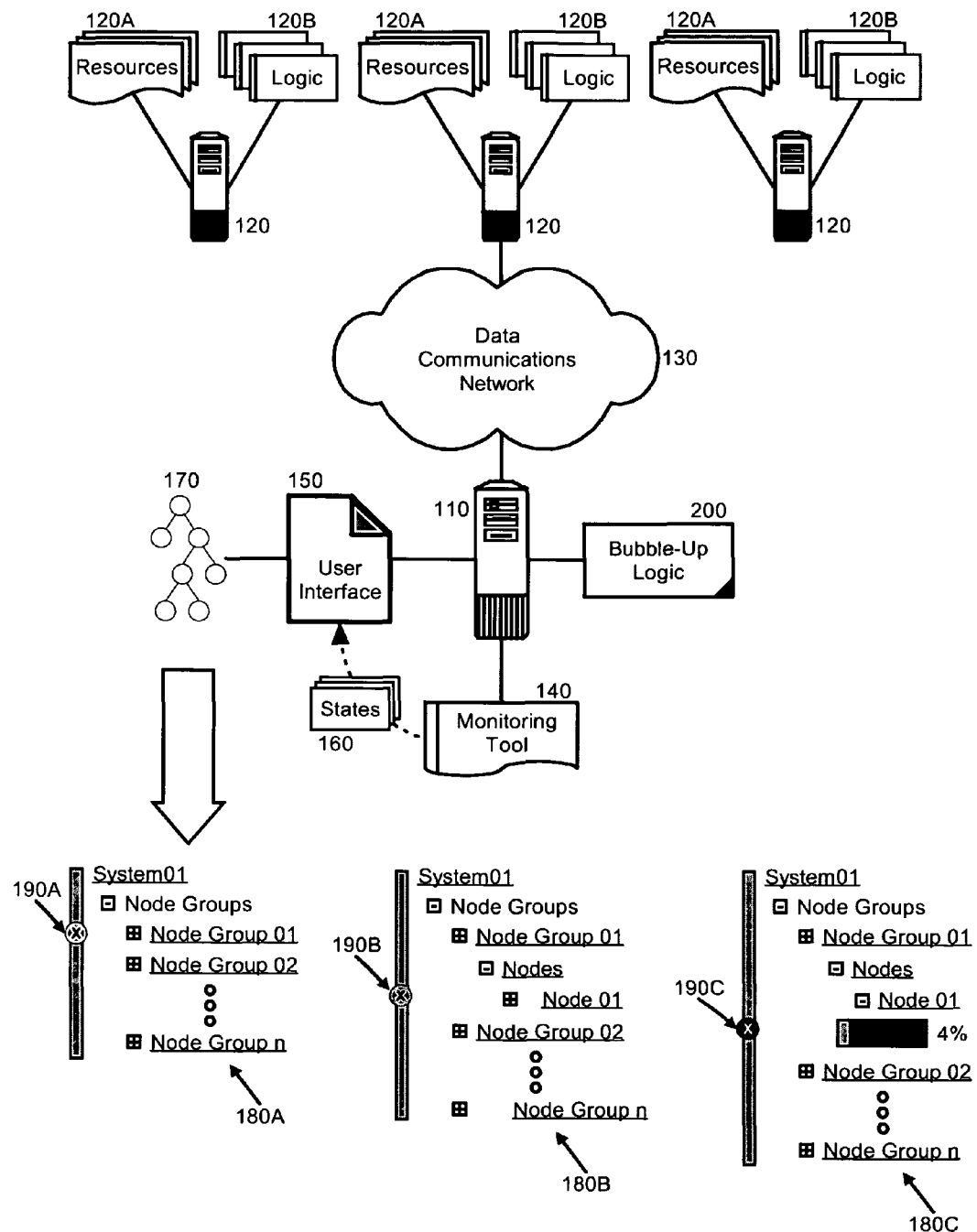
FIG. 1 is a schematic illustration of an application server monitoring tool disposed in an enterprise environment and configured for bubbling up condition severity indicators in a hierarchical tree control in the application server monitoring tool; and, FIG. 2 is a flow chart illustrating a process for bubbling up condition severity indicators in a hierarchical tree control.

In further illustration of an embodiment of the invention, FIG. 1 is a schematic illustration of an application server monitoring tool disposed in an enterprise environment and configured for bubbling up condition severity indicators within a hierarchical tree control in the application server monitoring tool. As shown in FIG. 1, a host computing platform 110 having an application server monitoring tool 140 can be communicatively coupled to one or more application server platforms 120 over a data communications network 130. Each of the application server platforms 120 can have both resources 120A and application logic 120B and the monitoring tool 140 can monitor the operation of each of the application server platforms 120.

Notably, the monitoring tool 140 can provide a user interface 150 which further can include a hierarchical tree control 170. The hierarchical tree control 170 can provide a visual status indicator for visible nodes in the hierarchical tree control 170 according to states 160 for selected ones of the resources 120A and application logic 120B in the communicatively coupled application server platforms 120. In accordance with the inventive arrangements, bubble-up logic 200 further can be provided to bubble-up condition severity indicators within the hierarchical tree control.

Specifically, the bubble-up logic 200 can identify nodes with are not visible within a collapsed branch of the hierarchical tree control 170. Referring to the visual rendering 180A of the hierarchical tree control 170 of FIG. 1, if the identified nodes have a status which requires the rendering if a visual representation of the status in the form of a status icon 190A, the status icon 190A can be associated with a visible parent node. To the extent that multiple hidden nodes have a status which requires the rendering of a visual representation of the status, the most severe status among the nodes can be associated with the parent node in that a status icon 190A of the status of the hidden node can be rendered adjacent to the visible parent node.

As shown in FIG. 1, the status icon 190A can include display characteristics indicative of the depth of the hidden node in the hierarchical tree control 170. For example, the status icon 190A can include shading which becomes darker and more intense as proximity of the hidden node nears the visible parent node associated with the status icon 190A. The varying degrees of representation of the status icon 190A, 190B, 190C are shown in the different visual renderings 180A, 180B, 180C of the hierarchical tree control 170 as shown in FIG. 1. It is to be further noted that as the branches of the hierarchical tree control are expanded so as to expose nodes in a visible manner, the status icon 190A, 190B, 190C can shift position to be adjacent to the parent node nearest to the hidden node having the severity status giving rise to the status icon 190A, 190B, 190C.

Figure 2:
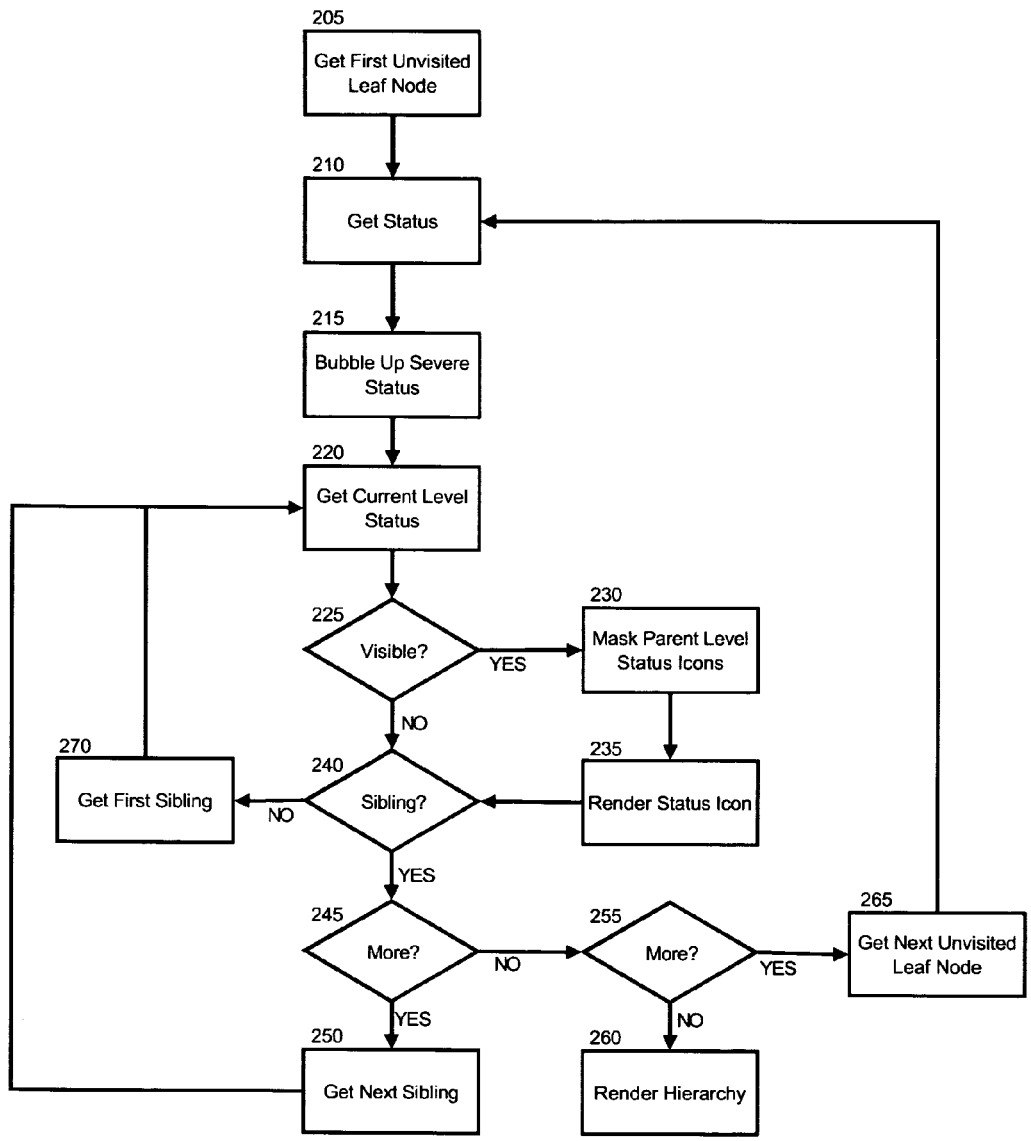

In further illustration of the operation of the bubble-up logic 200, FIG. 2 is a flow chart illustrating a process for bubbling up condition severity indicators within a hierarchical tree control. Beginning in block 205, a first unvisited leaf node in the hierarchical tree control can be retrieved for processing and in block 210, a status can be obtained for the node. In block 215, the status for the node can be bubbled up to the parent node. Subsequently, in block 220, a current status can be obtained for the current level.

In decision block 225, it can be determined if the node is visible in the hierarchical tree control. If so, the status icons for the parent node can be masked in block 230 and the status icon for the node can be rendered in block 235. Subsequently, in decision block 240, it can be determined if the node is a sibling of a leaf node. If not, the process will obtain the first sibling in block 270 and return to block 220 to process it. Otherwise, in decision block 245, it can be determined if the node has more siblings. If so, the next sibling of the node can be retrieved and the process can repeat in block 220. Otherwise, in decision block 255 it can be determined if additional leaf nodes remain to be processed. If so, in block 265 the next unvisited leaf node can be retrieved for processing and the process can repeat through block 210. Otherwise, in block 260 the hierarchy can be rendered.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A computer automated method for bubbling-up condition severity indicators in a hierarchical tree control, comprising:
    identifying a node in the hierarchical tree control that has been obscured in a collapsed branch of the hierarchical tree control;
    bubbling-up a status for said identified node to a visible parent node;
    rendering a status icon for said status adjacent to said visible parent node; and,
    responsive to an expansion of said collapsed branch rendering said identified node visible, relocating said status icon adjacent to said identified node.

2. The method of claim 1, wherein said identifying a node in the hierarchical tree control that has been obscured in a collapsed branch of the hierarchical tree control, comprises:
    selecting a plurality of nodes in the hierarchical tree control that have been obscured in a collapsed branch of the hierarchical tree control;
    obtaining a status for each of said selected nodes;
    determining a most severe status for said selected nodes; and,
    performing said bubbling-up, rendering and relocating using said most severe status.

3. The method of claim 1, wherein said rendering a status icon for said status adjacent to said visible parent node, comprises:
    determining a depth for said identified node;
    selecting a visual characteristic for said status icon based upon said depth; and,
    rendering said status icon using said selected visual characteristic.

4. The method of claim 3, wherein said selecting a visual characteristic for said status icon based upon said depth, comprises selecting a shading for said status icon based upon said depth.

5. The method of claim 3, wherein said selecting a visual characteristic for said status icon based upon said depth, comprises selecting a visual characteristic for said status icon based upon a relative distance of said identified node from said visible parent node.

6. The method of claim 4, wherein said selecting a shading for said status icon based upon said depth, comprises selecting a shading for said status icon based upon a relative distance of said identified node from said visible parent node.

7. A data processing system for bubbling-up condition severity indicators in a hierarchical tree control, the system comprising:
    a monitoring tool coupled to a host computing platform;
    a user interface associated with said monitoring tool;
    a hierarchical tree control disposed in said user interface, said hierarchical tree control comprising a plurality of nodes in collapsible and expandable branches; and,
    bubble-up logic coupled to said hierarchical tree control, said bubble-up logic comprising program code enabled to render a status icon for a hidden one of said nodes adjacent to a visible parent node for said hidden one of said nodes, said bubble-up logic further comprising program code enabled to relocate said status icon adjacent to said hidden one of said nodes when expanding a branch containing said hidden one of said nodes to render said hidden one of said nodes visible.

8. The data processing system of claim 7, wherein said monitoring tool is an application server monitoring tool.

9. The data processing system of claim 7, wherein each node of said hierarchical tree comprises an association with one of a resource or logic in a communicatively coupled to said monitoring tool.

10. The data processing system of claim 8, wherein each node of said hierarchical tree comprises an association with an application server communicatively coupled to said application server monitoring tool.

11. The data processing system of claim 7, wherein said status icon comprises a visual characteristic selected according to a depth of said hidden one of said nodes in said hierarchical tree control.

12. The data processing system of claim 7, wherein said status icon comprises a shading selected according to a depth of said hidden one of said nodes in said hierarchical tree control.

13. The data processing system of claim 7, wherein said status icon comprises a shading selected according to a relative distance of said hidden one of said nodes from said visible parent node.

* * * * *